Jan. 19, 1965 G. HINDERER ETAL 3,166,097
SHEAR SEAL VALVE
Filed Nov. 17, 1961 5 Sheets-Sheet 2

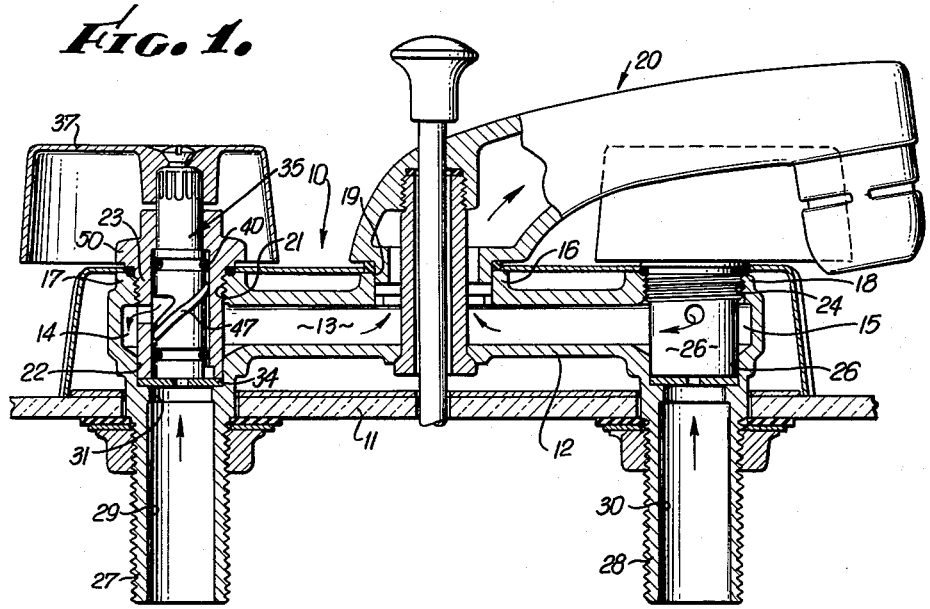
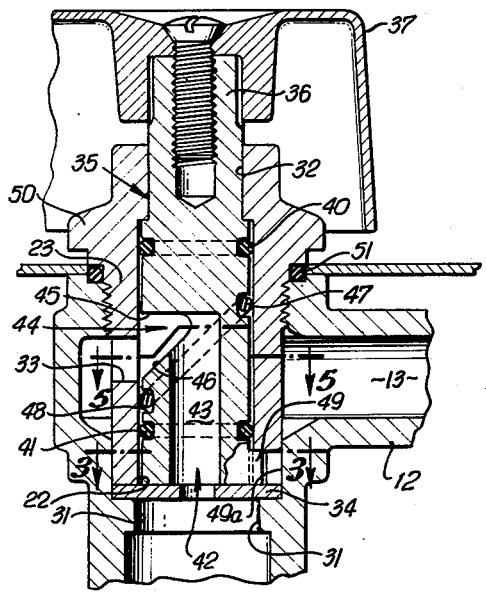
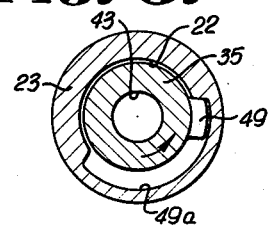
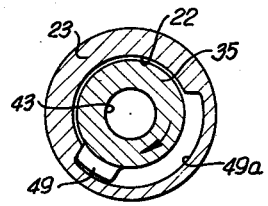
GOTTLOB HINDERER
RALPH E. THORP
INVENTORS.

GOTTLOB HINDERER
RALPH E. THORP
INVENTORS.

BY Flam and Flam
ATTORNEYS.

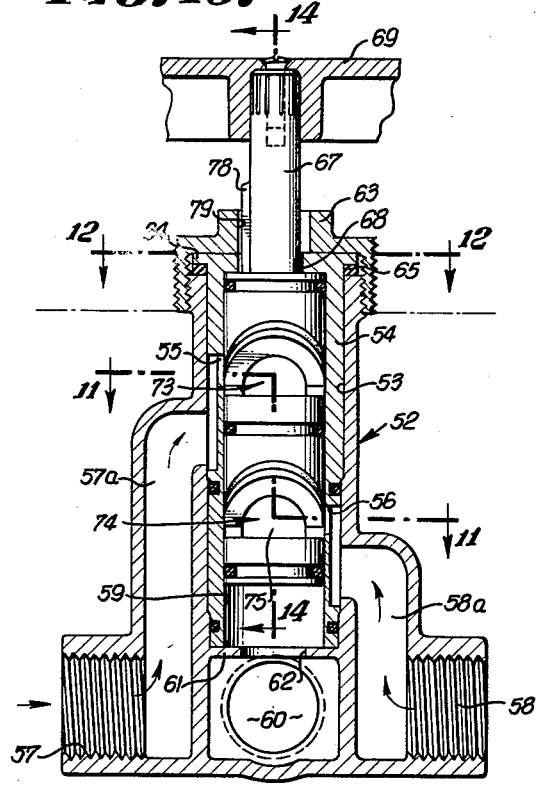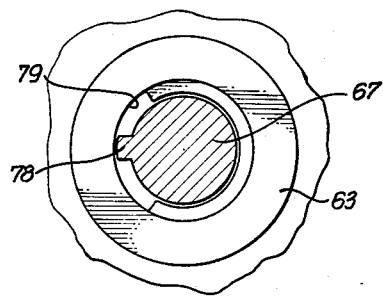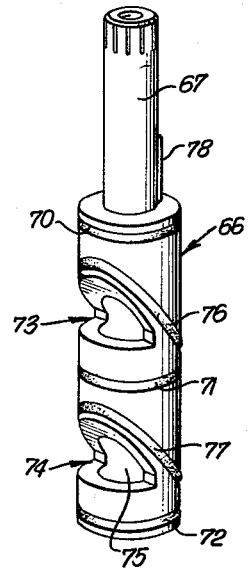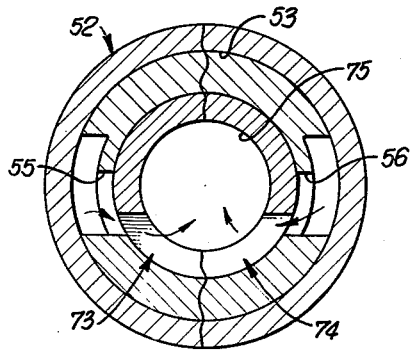
GOTTLOB HINDERER
RALPH E. THORP
INVENTORS.
BY Flam and Flam
ATTORNEYS.

Jan. 19, 1965

G. HINDERER ETAL 3,166,097

SHEAR SEAL VALVE

Filed Nov. 17, 1961

GOTTLOB HINDERER
RALPH E. THORP
INVENTORS.

BY *Flam and Flam*

ATTORNEYS.

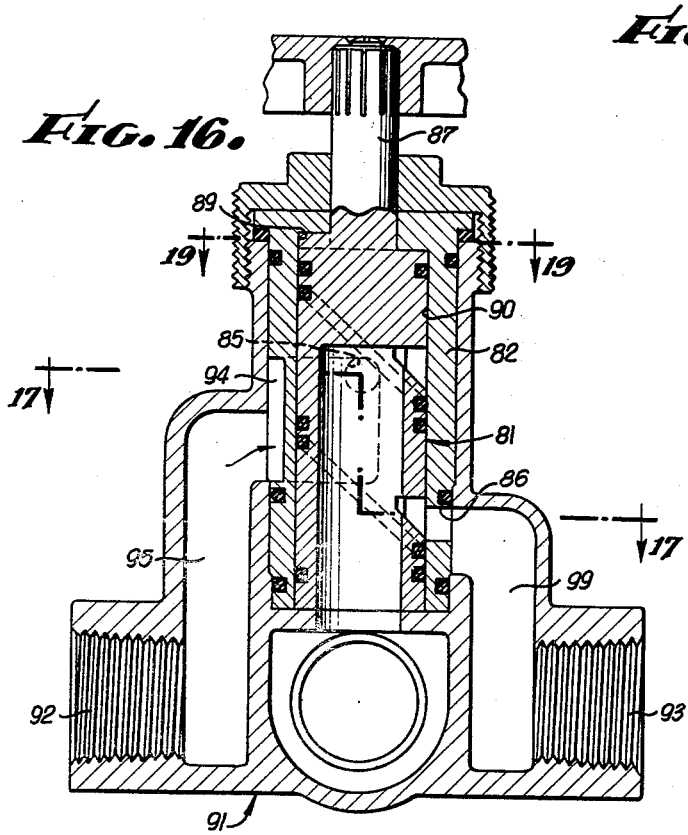
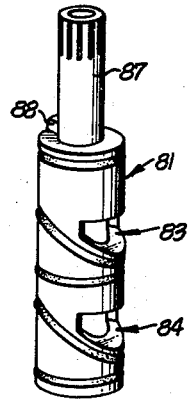
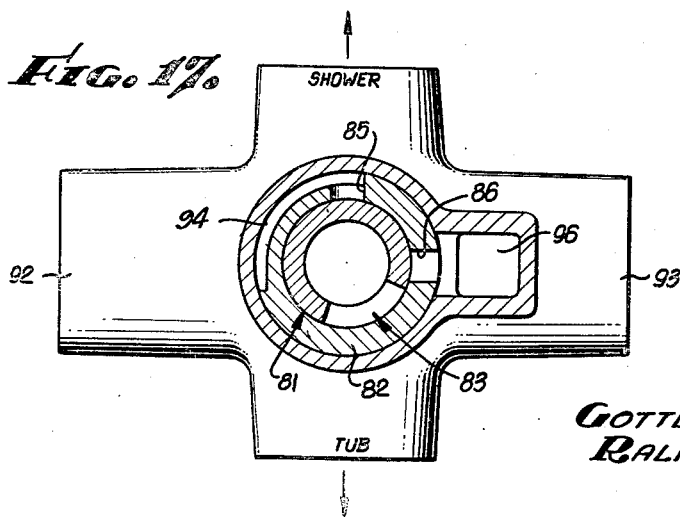
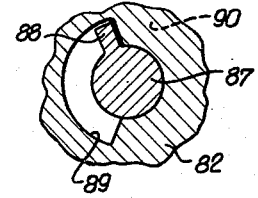
GOTTLOB HINDERER
RALPH E. THORP
INVENTORS.

3,166,097
SHEAR SEAL VALVE
Gottlob Hinderer, Sylmar, and Ralph E. Thorp, Glendale, Calif., assignors to Price-Pfister Brass Mfg. Co., Los Angeles, Calif., a corporation of California
Filed Nov. 17, 1961, Ser. No. 153,113
6 Claims. (Cl. 137—625.17)

This invention relates to a valve structure for use as a part of a lavatory or sink fixture, or the like. Particularly, this invention relates to a valve of the type having a removable seat structure in which the movable valve element is contained whereby all of the parts containing flow controlling seals are replaced as a unit.

The primary object of this invention is to provide an improved unit of this character that utilizes an O-ring as a dynamically operating shear seal member. Thus, the O-ring moves past a controlled port of the seat structure.

In the past, O-rings used in this manner failed after relatively few cycles of operation due to the severe shearing force imposed on the O-ring as it attempts to move back to the unported area. Some suggestion has heretofore been made that by arranging the flow direction in a particular manner, the fluid force could be utilized to keep the O-ring more or less confined in its seat so that it readily passes beneath the port edge. While the life of the valve is improved somewhat, failure inevitably results after seemingly short use.

An object of this invention is to provide a shear seal of this general character that is capable of millions of cycles of operation. In order to accomplish this result, use is made of a smooth Teflon O-ring in place of the conventional rubber or equivalent O-ring. Teflon has unusual characteristics in this organization. It is smooth enough to roll about the axis of its section, and elongate under the influence of the reactive forces until the ring, reduced in section by elongation, passes readily under the trailing edge of the port.

In a valve of this character, only slight angular movement critically moves the valve ports of the seat and closure out of and into registry. Another object of this invention is to provide a port configuration that reduces the critical nature of the valve movement and that also can be easily made by conventional manufacturing techniques. For this purpose, the closure port is provided with a "whistle" slot formed by a simple transverse milling operation with a bevelled cutter.

Another object of this invention is to provide simplified proportioning and volume control valves utilizing dynamically operating O-ring shear seals.

Another object of this invention is to provide an improved internal stop arrangement in valve structures of this character.

This invention possesses many other advantages, and has other objects which may be made more clearly apparent from a consideration of several embodiments of the invention. For this purpose, there are shown a few forms in the drawings accompanying and forming a part of the present specification, and which drawings, unless described as diagrammatic, or unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a fragmentary vertical sectional view of a lavatory fixture incorporating the present invention;

FIG. 2 is an enlarged fragmentary sectional view showing the valve apparatus of FIG. 1, the valve being open;

FIG. 3 is a sectional view taken along a plane corresponding to line 3—3 of FIG. 2;

FIG. 4 is a view similar to FIG. 3, but illustrating the valve in closed position;

FIG. 10 is an axial sectional view of a mixing valve incorporating the invention;

FIG. 11 is an enlarged sectional view taken along the offset plane corresponding to line 11—11 of FIG. 10;

FIG. 12 is an enlarged sectional view taken along a plane corresponding to line 12—12 of FIG. 10;

FIG. 13 is a pictorial view of closure structure forming a part of the present invention;

FIG. 16 is an axial sectional view of another valve incorporating the present invention;

FIG. 17 is a sectional view take along an offset plane corresponding to line 17—17 of FIG. 16;

FIG. 18 is a pictorial view of the closure structure; and

FIG. 19 is a fragmentary sectional view taken along a plane corresponding to line 19—19 of FIG. 16.

Figure 5:
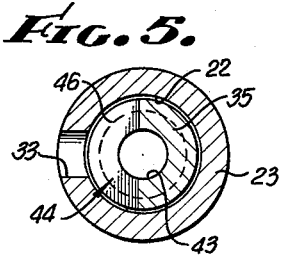
FIG. 5 is a sectional view taken along a plane corresponding to line 5—5 of FIG. 2.

In FIGURE 1, there is illustrated a lavatory fixture generally designated as 10, installed at a sink or deck 11. A brass casting 12 forms the essential passage forming part of the fixture 10.

The casting has a passage 13 that terminates at opposite ends in generally circular enlargements 14 and 15, respectively. On the top of the valve body three bosses 16, 17, and 18 are provided. The boss 16 is located at the center of the body 12, and has an aperture 19 extending to the passage 13 and at which a swing spout 20 is fitted. The bosses 17 and 18 have axes generally coaxial with the respective circular passage enlargements 14 and 15. A threaded opening 21 is formed through the boss to the top of the passage port 14. A boring tool forms a coaxial recess 22 at the bottom of the passage port. A generally cylindrical valve body 23 is designed to be inserted into the casting and to fit the recess 22 and the threaded opening 22.

The boss 18 is similarly provided with an opening as at 24, and a coaxial recess 25 for accommodating a similar valve body 26.

The casting 12 has inlet extensions 27 and 28 located beneath the recesses 22 and 25 and the corresponding valve bodies 23 and 26. These inlet extensions cooperate with hot and cold water supply lines, and project beneath the sink or deck 11 in a conventional manner. The valve bodies 23 and 26 are respectively interposed between passages 29 and 30 of the inlet extensions and the main casting passage 13 that communicates with the spout 20.

A detailed description of one of the valve structures will suffice as a description of the other since both are identical.

The inlet passage 29 communicates at its upper end with an opening 31 in the bottom of the recess 22 at which the body is accommodated. The body defines a path between the inlet passage 29 and the main casting passage by the aid of a through axial bore 32 and a lateral port 33 located at the level of the circular passage enlargement 14. By virtue of the circular enlargement 14, communication is independent of the angular position of the valve body 23 in the casting 12.

A flow restricting gasket or washer 34 is interposed between the bottom of the recess 22 and the body 23.

In order to control the communication between the lower inlet end of the body 23 and its lateral outlet 33, a closure structure 35 is provided at its upper end to fit the correspondingly reduced upper end of the body bore 32. The closure is angularly movable about its axis, and is held in the body 23 by the washer 34. The upper end of the stem 36 projects upwardly of the body 23 and is detachably connected to a decorative handle 37 in a conventional manner.

The closure 35 carries two spaced sealing O-rings 40 and 41 at the upper and lower ends thereof for engagement with the body bore 32 above and below the lateral outlet port 33. The upper sealing ring 40 prevents upward passage of water from the outlet 33 along the stem 35. The lower sealing ring 41 prevents passage of water from the inlet end of the body 23 to the outlet, except through the closure 35.

The closure 35 thus has a passage 42 that extends axially upwardly from its lower end; thence laterally to the outer surface of the closure at the level of the body outlet port 33. The axial part 43 of the closure passageway 42 is formed cylindrically, and registers with the inlet passage 29. The lateral part is formed as a slot 44.

Figure 6:
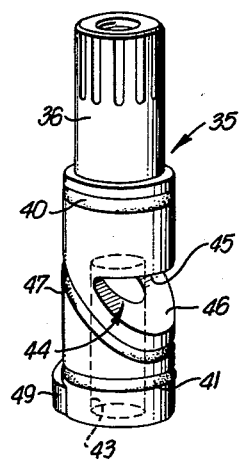
FIGS. 6 and 7 are pictorial views of the movable closure structure and the valve controlling O-ring.
Figure 7:

The slot 44 is formed by the removal of a wedge-shaped segment from the periphery of the closure 35. Thus, the slot 44 is generally defined by two planes the extensions of which intersect generally along a diametrically extending line. One of the planes (FIG. 6) extends perpendicular to the axis of the closure 34 and defines a downwardly facing surface 45 bounding the upper side of the slot. The other plane extends obliquely upwardly from the closure periphery, and generally at an angle of 45° to the closure axis to define the oblique surface 46. Surfaces 45 and 46 both intersect the cylindrical passageway part 43 whereby the slot 44 as a whole forms an enlarged outlet end of the passageway 42.

The lower outer edge of the oblique surface 46, as illustrated in FIG. 2, falls at the level of the lower portion of the circular body outlet 33.

In practice, the slot 44 is formed by a milling operation using a bevelled tool.

Extending along the exterior of the closure 35 is a Teflon sealing ring 47 that engages the body 32. This ring 47 extends in an obliquely oriented groove 48 located beneath and paralleling the oblique surface 46 of the slot 44. The Teflon ring 47 extends to a point beneath the outlet passage 33 to a point above the outlet passage 33. The ring 47 defines two complementary wedge-shaped segments along the closure periphery, one from the ring 47 to upper sealing ring 40, and the other from Teflon ring 47 to lower sealing ring 41. The upper wedge segment is common to the closure passageway 42, the slot 44 intersecting this area of the closure. The lower wedge segment is isolated from the inlet, or sealed.

Figure 9:
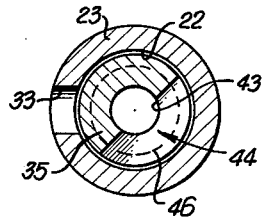
FIG. 9 is a sectional view similar to FIG. 5, but illustrating the parts in closed position.

In the position of FIGS. 2 and 5, the lateral outlet port 33 of the body 23 communicates with the upper wedge segment and thus with the inlet. Upon angular movement of the closure 35 away from the position illustrated in FIG. 2, and to the position of FIG. 9, the Teflon O-ring 47 passes across the outlet port 33 and places the outlet port 33 in communication with the lower wedge segment. Thus the outlet is sealed.

The groove 48 in which the Teflon ring 47 is accommodated is wide enough to allow the ring 47 to roll therein. The ring 47 is slightly compressed in the body bore 32. However, the ring 47 is normally not circumferentially stressed in the groove 48. As the ring 47 passes through the leading edge of the opening 33, it extrudes slightly therein. As it passes the trailing edge of the opening 33, the Teflon ring rolls underneath the edge, and in the process, stretches as the length exposed at the opening diminishes until the ring passes the opening 33.

Figure 8:
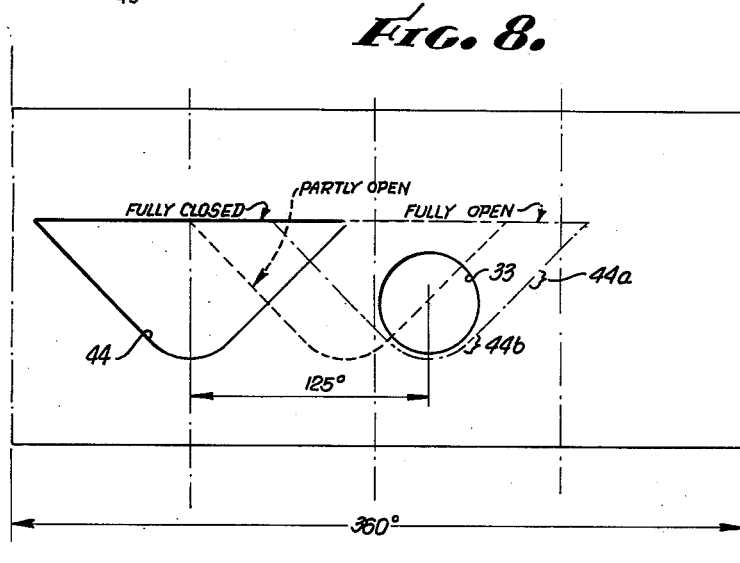
FIG. 8 is a diagrammatic developed view illustrating the registry of the control ports as a function of their relative angular positions.

Due to the configuration of the slot 44, the outlet opening is gradually opened and closed upon angular movement of the closure 35, and as illustrated in FIG. 8. The area of the slot 44 at the periphery of the closure 35 is depicted in developed fashion and at several positions relative to the outlet 33.

In the present example, the lateral outlet 33 occupies an angular span of roughly 45°. If the slot 44 were circular and of the size at least as great as that of the lateral outlet 33, then movement of the closure through an angle of 45° would be necessary to move the valve from closed to open, or from open to closed, because upon movement in one direction the same portion of the edge that initially intersects the outlet opening 33 would be the same portion that finally intersects the opening 33. However, in the arrangement depicted, that portion 44a of the leading edge of the slot 44 which initially intersects the opening 33, is located angularly well in advance of that portion 44b of the edge which is the last to intersect the slot. Accordingly, a 90° movement is required for initial opening to full opening of the outlet 33.

The valve closure 33 has defined limits of movement. One of the limits corresponds to the fully open position illustrated in FIGS. 1, 2 and 5, and the other limit corresponds to the fully closed position of FIG. 9. These positions are separated more than 90° to ensure that in closed position the ring 47 is well away from the outlet 33. Thus the limits are separated roughly by 125°.

The lower end of the closure 34 has a radial projection 49 (FIGS. 3, 4, and 6) that operates in the slot 49a formed about the end of the body bore 32. The angular extent of the slot 49a, less the angular span of the projection 47 is 125° to allow that movement. The projection 49 and slot 49a are so oriented relative to the slot 44 and outlet 33 as to determine, appropriately, the relative positions of the slot 44 and outlet 33 at the limits defined by the projection 49 and slot 49a.

The body 23, together with the closure 35, and thus all parts forming operative parts of the dynamic seal, are removable as a unit. To accomplish removal, the body 23 is rotated to cause separation from the threaded opening 22. The valve body 23 is provided with a non-circular flange 50 at the upper end of the body threads. This flange is cooperable with a suitable tool to facilitate rotation. A sealing ring 51 is clamped between the casting 12 and flange 50 to establish a seal.

In the form illustrated in FIGS. 10 to 15, a mixer valve structure is illustrated that is capable of proportion and volume adjustment.

A body casting 52 provides an upwardly opening generally cylindrical recess 53. The casting is intended to be accommodated in a wall with only the end of the casting at the recess opening projecting from the wall. In the cylindrical recess 53, a removable valve unit is accommodated. The valve unit includes a hollow body 54 that lines the recess 53. The body 54 has two axially spaced lateral openings 55 and 56 located on opposite sides of the body axis. These openings communicate with aligned hot water and cold water inlet passages 57 and 58 formed at opposite sides of the base of the body casting 52. The inlet passages 57 and 58 have upward extensions 57a and 58a.

The cylindrical bore 59 of the body to which the openings 55 and 56 extend, opens at its lower end to communicate with a discharge passage 60.

The lower edge of the body 54 engages a partition wall 61 that forms a part of the top wall of discharge conduit 60 located beneath the recess and extending at right angles to the inlets 57 and 58. A port 62 establishes the communication between the interior of the valve body 54 and the conduit 60.

In order to hold the body 54 in place, a bonnet 63 is provided. The bonnet engages threads formed on the upper end of the casting 52, and clamps a flange 64 formed at the top of the body, against the casting 52. A sealing ring 65 between the parts provides a seal. The bonnet itself is exteriorly threaded for cooperation with a decorative collar or escutcheon.

Cooperable with the inlets 55 and 56 is a valve closure 66 accommodated in, and rotatable in the cylindrical recess 59 of the body 54. The closure 66 has a reduced stem 67 that passes upwardly through a restricted opening 68 formed in the upper end of the cylindrical recess 59, and through the bonnet 63. A handle 69 is fastened to the end of the stem 57 whereby the valve is manipulated.

Figure 14:
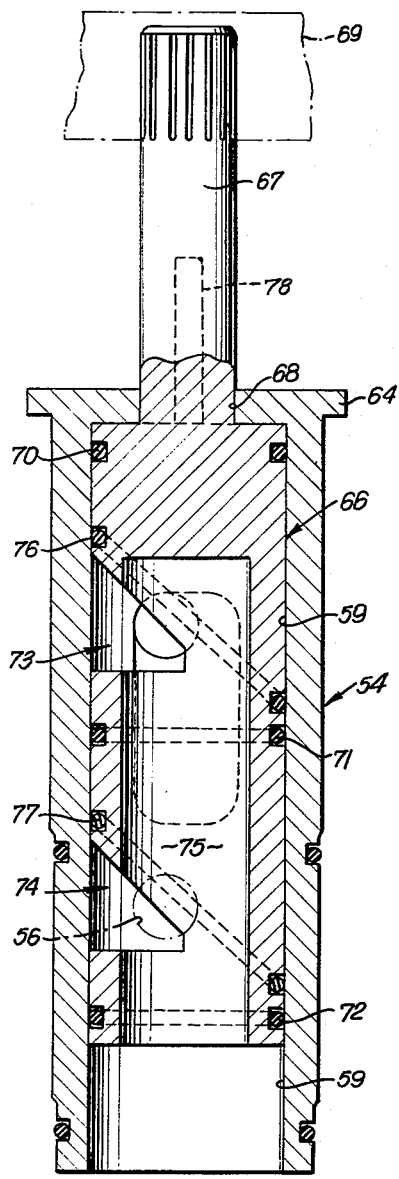
FIG. 14 is an enlarged sectional view taken along a plane corresponding to line 14—14 of FIG. 10.
Figure 15:
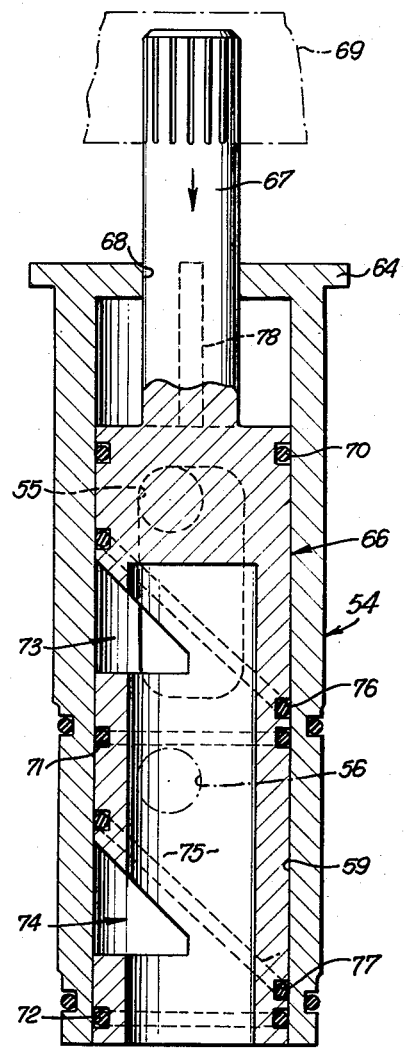
FIG. 15 is a view similar to FIG. 14, but illustrating the valve parts in a different position.

The closure 66 is axially movable in the recess, and between limits provided by the upper end of body recess 59 (FIG. 14) and the partition wall 61 (FIG. 15).

The closure 56 has three axially spaced sealing rings 70, 71, and 72. The sealing rings 70 and 71 are located on opposite sides of the inlet 55 whatever may be the axial position of the closure, and the sealing rings 71 and 72 are similarly located on opposite sides of the inlet 56. Between the sealing rings 70 and 71 the closure 66 has a wedge-shaped slot 73 that cooperates with the opening 55. The closure also has a wedge-shaped slot 74 located between the sealing rings 71 and 72 that cooperates with the inlet 56. The slots 73 and 74 have configurations similar to the slot 44 of the closure in the form just described. However, the oblique portions of the slots lie above the perpendicular portions of the slots. The slots 73 and 74 are located one above the other and have an operative angular extent of about 180°. Since the inlets 55 and 56 are located in 180° relationship, rotation of the closure 66 serves oppositely to adjust the registry of the slots with their corresponding inlet ports 55 and 56. A downwardly opening axial recess 75 of the closure passes water entering via slots 73 and 74 to the discharge conduit 60. O-rings 76 and 77 of Teflon material are respectively accommodated in oblique grooves just above the slots 73 and 74.

Since the controlling O-rings 76 and 77 extend oblique to the axis of the closure, axial movement of the closure will affect the degree of opening of the corresponding inlet just as angular movement affects the degree of opening.

Thus, in order to control the combined volume of flow through the inlets 55 and 56, the valve closure 66 is axially moved, as shown in FIGS. 14 and 15. In the inwardmost position of the closure 66, the O-rings 76 and 77 are entirely beneath their corresponding inlet openings 55 and 56 and thus isolate the slots 73 and 74 therefrom whatever may be the angular orientation of the closure. In the opposite position of FIG. 14, the O-rings 76 and 77 extend both above and below their corresponding inlets, and full registry of slots 73 and 74 is possible. Between these limits, the degree of registry may be restricted. A volume and proportion control is accordingly achieved.

A lateral projection 78 formed on the stem (FIG. 12) cooperates with an enlarged groove 79 in the upper end of the body 54 in order to define opposite limits to the angular movement of the closure. These limits correspond to full cold and full hot.

In the form of the invention illustrated in FIGS. 16 to 19, a closure structure 81 is provided that is similar to the closure of the previous form. The closure 81 is accommodated in body structure 82 in such manner that it is permitted only angular movement therein.

The closure 81 has two wedge-shaped slots 83 and 84 one above the other that cooperate with inlets 85 and 86 of the body structure 82. The slots 83 and 84 in this instance span an angle of approximately 90°. Thus the apex of the wedge is spaced from the axis of the closure. The inlets 85 and 86 are angularly spaced whereby the opposite adjustment of the inlets results upon movement of the closure in one direction. The inlets 85 and 86 furthermore are located in approximately 90° relationship.

The 90° span of inlets and slots allows for the closure to be moved to a position (FIG. 17) in which both inlets are closed.

Adjoining the base of the stem 87 of the closure 81 is a projection 88 (FIG. 19) that works in a groove 89 formed in the bottom of the cylindrical body recess 90. The ends of the groove 89 are so situated that at one limit, the valve is in a position corresponding to full hot and at the other limit (FIG. 17) in a closed position beyond full cold.

In order to allow the inlets 85 and 86 to be disposed at 90° relationship with respect to each other in a body casting 91 that has inlets 92 and 93 coaxially located on opposite sides, the periphery of the body 82 is provided with a peripheral inlet extension 94, one end of which registers with an upward extension 95 of the inlet passage 92. The other inlet 86 directly registers with an upward extension 96 of the other inlet 93.

The inventors claim:

1. In a valve structure for controlling the flow of fluid: a valve body having provisions for attachment at an opening of a member with one end of the body within the member; said body providing an interior space of substantially circular cross-section and a lateral valve port extending from said space exteriorly of the body; a closure mounted in and supported at the interior space and having an interior chamber; said closure having a slot extending from the periphery of said closure to said interior chamber, the slot being defined substantially by upper and lower intersecting planes both transverse to the axis of the closure and diverging outwardly from each other from an area of intersection; the projected line of intersection of said planes being located adjacent the axis of said closure and substantially perpendicular thereto; the said projected line of intersection being located axially beyond the lateral valve port of said body; substantially the entire space between the planes on one side of said intersection line being open; one of said planes being oblique to the closure and sweeping across said lateral valve port as the closure is angularly moved; an oblique sealing ring mounted peripherally of the said closure, and substantially paralleling said one oblique plane for corresponding traverse across said lateral valve port; and seal means co-operating with said sealing ring to define a sealed space on the periphery of said closure to which said lateral valve port is exposed when said slot is out of registry with said lateral valve port.

2. The combination as set forth in claim 1 in which said sealing ring is made of material having the toughness characteristics of Teflon.

3. In a valve structure for controlling the flow of fluid: a valve body having provisions for attachment at an opening of a member with one end of the body within the member; said body having an interior space of substantially circular cross-section and a pair of lateral valve ports extending from said space and exteriorly of said body; said lateral valve ports being located at different positions along the axis of said interior space; a closure mounted in and supported at said body space; said closure having an interior chamber; said closure having a pair of slots for the valve ports rsepectively, and communicating with said closure chamber, each slot being defined substantially by upper and lower intersecting planes both transverse to the axis of the closure and diverging outwardly from each other from an area of intersection; the projected line of intersection of said planes being located adjacent the axis of said closure and substantially perpendicular thereto; the said projected line of intersection being located axially beyond the lateral valve port of said body; substantially the entire space between the planes on one side of said intersection line being open; one of the planes for each slot being oblique to the closure and sweeping across the corresponding lateral valve port; sealing means isolating the valve ports from each other at the periphery of said closure; an oblique sealing ring for each slot and mounted peripherally of the closure, and paralleling the corresponding one oblique plane for similar traverse across the corresponding lateral port; first seal means cooperating with one of said sealing rings to define a sealed space on the periphery of said closure to which the corresponding lateral valve port is exposed when the corresponding slot is out of registry with said lateral valve port; and second seal means cooperating with one of said sealing rings to define a sealed space on the periphery of said closure to which the corresponding lateral valve port is exposed when the corresponding slot is out of registry with said lateral valve port; said valve ports being so located that angular movement of the closure affects a relative proportioning adjustment of the valve ports.

4. The combination as set forth in claim 3 in which said closure is axially movable in the body to move the said lateral valve ports into their said sealed spaces to shut off flow irrespective of the angular position of the closure.

5. The combination as set forth in claim 3 in which said slots are aligned one above the other, and in which said valve ports are located at angularly spaced positions.

6. The combination as set forth in claim 1 in which the closure has an axially extending stem projecting through one end of the body, the closure being removable through the other end of the body, the closure at the end opposite its stem having a projection and said body having an arcuate groove receiving the projection to determine limits to the angular movement to the closure.

References Cited in the file of this patent
UNITED STATES PATENTS

| | | |
|---|---|---|
| 560,655 | Smith | May 26, 1896 |
| 1,016,382 | Weeden | Feb. 6, 1912 |
| 1,214,267 | Block | Jan. 30, 1917 |
| 1,925,086 | Snyder | Sept. 5, 1933 |
| 2,631,002 | Mueller | Mar. 10, 1953 |
| 2,766,771 | Wenzel | Oct. 16, 1956 |
| 2,847,031 | Brown | Aug. 12, 1958 |
| 2,889,134 | Bryant | June 2, 1959 |
| 2,987,070 | Fraser | June 6, 1961 |
| 2,988,107 | Rudelick | June 13, 1961 |
| 3,066,908 | Floren | Dec. 4, 1962 |

FOREIGN PATENTS

| | | |
|---|---|---|
| 10,716 | Great Britain | of 1899 |
| 657,056 | Great Britain | Sept. 12, 1951 |
| 287,969 | Switzerland | Dec. 31, 1952 |